Oct. 22, 1929.    P. A. HOGLUND    1,733,019
EDGER GAUGE ATTACHMENT
Filed Dec. 3, 1928    2 Sheets-Sheet 1
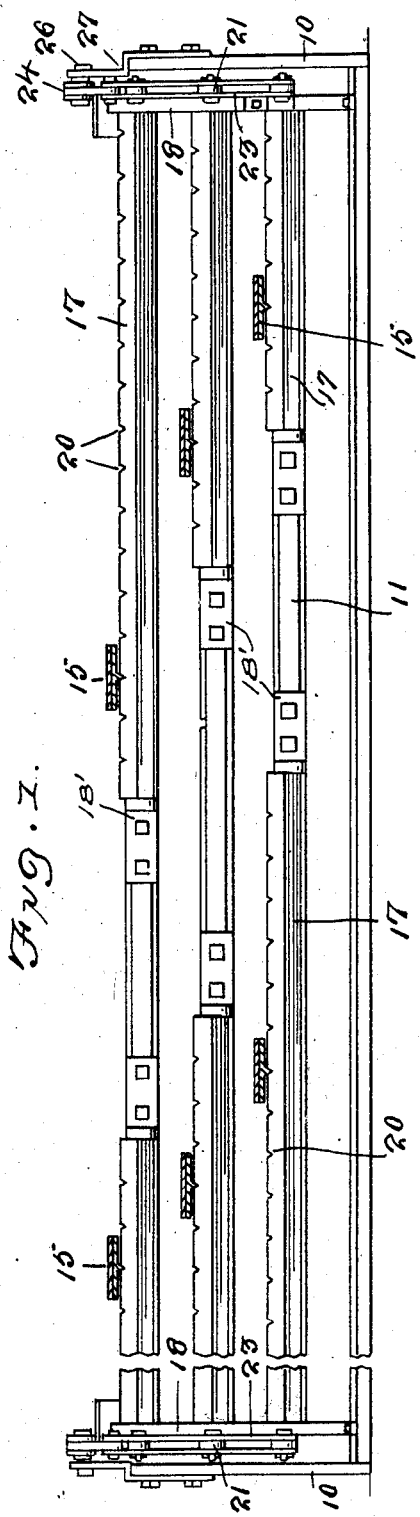
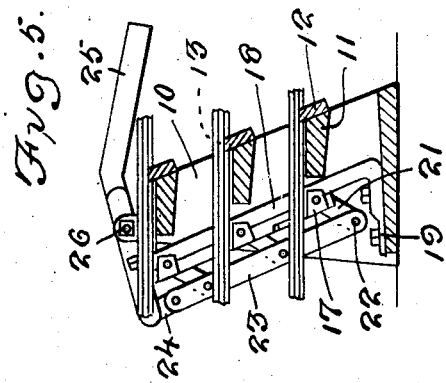
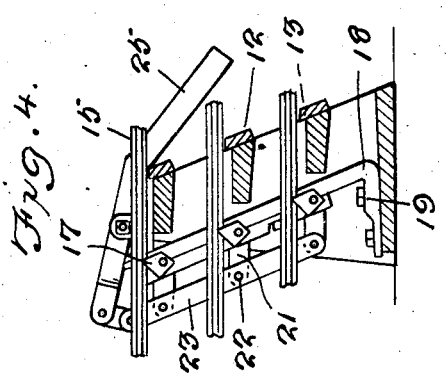
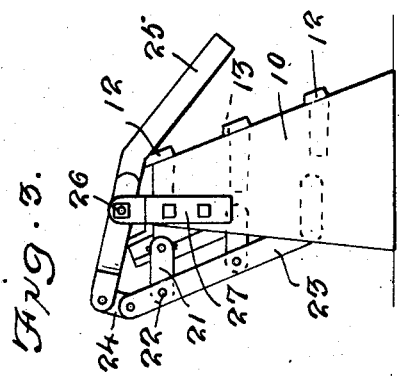
P. A. Hoglund
INVENTOR
BY Victor J. Evans
ATTORNEY Oct. 22, 1929.  P. A. HOGLUND  1,733,019
EDGER GAUGE ATTACHMENT
Filed Dec. 3, 1928  2 Sheets-Sheet 2
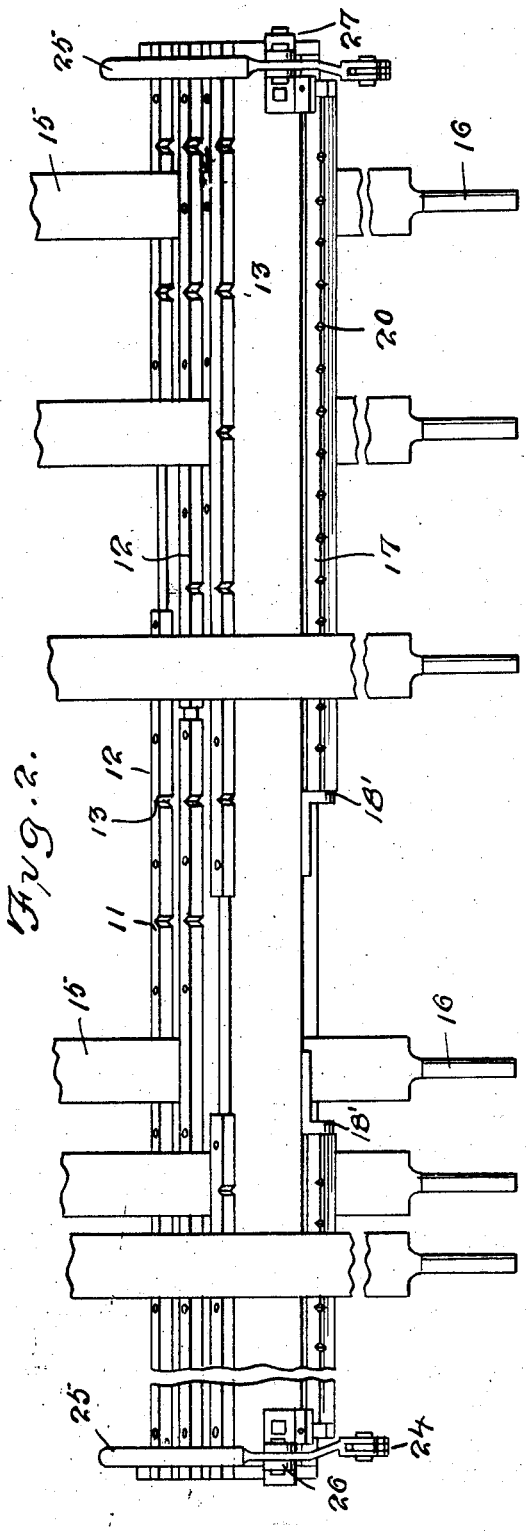
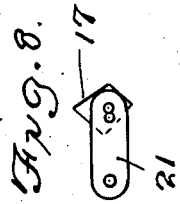
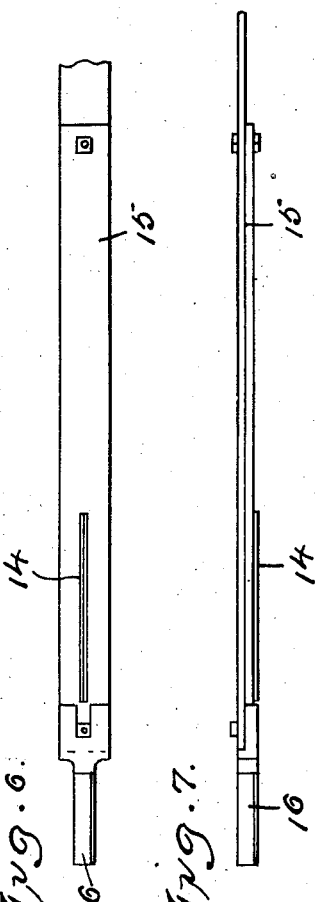
P. A. Hoglund
INVENTOR
BY Victor J. Evans
ATTORNEY Patented Oct. 22, 1929

1,733,019

UNITED STATES PATENT OFFICE

PETER A. HOGLUND, OF IRONWOOD, MICHIGAN

EDGER-GAUGE ATTACHMENT

Application filed December 3, 1928. Serial No. 323,445.

This invention relates to improvements in edger gauge attachments for saws, an object being to provide an attachment which, when applied to the usual edger gauge for cutting stock width lumber, will adapt the gauge for cutting odd widths also.

Ordinarily, the gauge bars of an edger gauge are arranged for cutting stock width lumber only, and to arrange these bars for cutting odd widths of lumber would be difficult in view of the bulk and weight of the shifting levers. The invention therefore provides auxiliary gauge bars arranged for cutting odd widths, these auxiliary bars being used in conjunction with the ordinary bars. In addition, the invention provides means for transferring the shifting levers from the ordinary bars to the auxiliary bars and vice versa, and thus eliminates the disadvantage above mentioned.

With the above and other objects in view, the invention further includes the following novel features and details of construction, to be hereinafter more fully described, illustrated in the accompanying drawings and pointed out in the appended claims.

In the drawings:—

Figure 1 is an elevation of an edger gauge showing the shifting levers in section.

Figure 2 is a plan view partly broken away.

Figure 3 is an end view of the edger gauge.

Figure 4 is a transverse sectional view showing the auxiliary gauge bars in use.

Figure 5 is a similar view showing the stationary gauge bars in use.

Figure 6 is a bottom plan view of one of the shifting levers.

Figure 7 is an edge view of the same.

Figure 8 is an end view of one of the auxiliary gauge bars and its attached link.

Referring to the drawings in detail wherein like characters of reference denote corresponding parts, the reference character 10 indicates the end members of the frame of the edger gauge and 11 bars which connect the end members. Extending along the edges of the bars 11 are stationary gauge bars 12. These bars are provided with relatively widely spaced notches 13 to receive a tongue 14 provided upon the under face of saw shifting levers 15. Each lever is provided with a handle 16 to facilitate shifting and the edger gauge shown is designed for a six saw edger so that six shifting levers 15 are illustrated.

The bars 12 have their notches spaced so as to adapt the edger gauge for cutting stock widths, it being impractical to provide intermediate notches so as to adapt the gauge for cutting lumber of odd widths, due to the bulk and weight of the shifting levers which renders them difficult to handle.

These disadvantages are overcome in the present invention by providing auxiliary gauge bars 17. These bars are pivotally mounted in standards 18 which are secured to the frame as indicated at 19 and in brackets 18', and have their edges provided with spaced notches 20 representing divisions of the spaces between the notches 13. The notches 20 are so arranged that when the tongues of the shifting levers are engaged therein, widths of lumber other than the stock widths provided by the notches 13 may be cut.

Rigid with the gauge bar 17 are links 21 whose outer ends are pivotally connected as shown at 22 with connecting bars 23 provided at opposite ends of the frame of the edger gauge. The bars 23 are connected by means of links 24 with levers 25, the latter being pivotally mounted as shown at 26 upon a bracket 27 secured to the end members 10 of the frame.

By reference to Figures 4 and 5 of the drawings it will be seen that the levers 25 may be operated to engage the shifting levers 15 with either the bars 17 or the bars 12. When it is desired to change from stock width lumber to odd widths, the bars 17 are moved to the position shown in Figure 4 so that the shifting levers 15 may be engaged therewith, while in cutting stock width lumber the bars 17 are arranged as shown in Figure 5.

The invention is susceptible of various changes in its form, proportions and minor details of construction and the right is herein reserved to make such changes as properly fall within the scope of the appended claims.

Having described the invention what is claimed is:—

1. In an edger gauge for saws, stationary gauge bars, shifting levers, means to provide engagement between the shifting levers and gauge bars to control the saws, movable gauge bars, means to provide engagement between the movable gauge bars and the shifting levers, and means to transfer the shifting levers from the stationary gauge bars to the movable gauge bars and vice versa.

2. In an edger gauge for saws, stationary gauge bars, shifting levers, means to provide engagement between the shifting levers and gauge bars to control the saws, movable gauge bars, means to provide engagement between the movable gauge bars and the shifting levers, and means whereby movement of the movable gauge bars will transfer the shifting levers from the stationary gauge bars to the movable gauge bars and vice versa.

3. In combination with an edger gauge for saws including stationary gauge bars, shifting levers, means provided upon said bars for adjustably positioning the shifting levers, movable gauge bars, means provided upon the movable gauge bars for adjustably positioning the shifting levers, and means to operate the movable gauge bars to engage the shifting levers with either the stationary gauge bars or the movable gauge bars.

4. In combination with an edger gauge for saws including stationary gauge bars, shifting levers, means provided upon said bars for adjustably positioning the shifting levers, pivotally mounted gauge bars spaced from the stationary gauge bars, means connected with the movable gauge bars to provide for simultaneous movement of the latter, means provided upon the movable gauge bars for adjustably positioning the shifting levers, and means whereby movement of the movable gauge bars will transfer the shifting levers from the stationary gauge bars to the movable gauge bars and vice versa.

In testimony whereof I affix my signature.

PETER A. HOGLUND.